United States Patent [19]

Schwarz

[11] 4,267,740

[45] May 19, 1981

[54] SHAFT-TURNING DEVICE

[75] Inventor: Hans Schwarz, Umiken, Switzerland

[73] Assignee: BBC Brown, Boveri & Co., Ltd., Baden, Switzerland

[21] Appl. No.: 70,106

[22] Filed: Aug. 27, 1979

[30] Foreign Application Priority Data

Sep. 14, 1978 [CH] Switzerland .................. 9625/78

[51] Int. Cl.³ .................. F16H 27/02; F16H 31/00
[52] U.S. Cl. .................. 74/128; 74/575
[58] Field of Search .............. 74/126, 128, 139, 141 S, 74/142, 162, 575, 576, 577 R, 577 S, 578

[56] References Cited

U.S. PATENT DOCUMENTS

| 133,949 | 12/1872 | Otstot | 74/577 S |
|---|---|---|---|
| 1,939,887 | 12/1933 | Ferris et al. | 74/128 |
| 2,126,176 | 8/1938 | Davis | 74/128 |
| 2,563,584 | 8/1951 | Crookston | 74/128 |
| 2,900,840 | 8/1959 | Greve | 74/578 |
| 3,057,147 | 10/1962 | Hetzel | 74/126 |
| 4,018,094 | 4/1977 | Schmidt | 74/128 |
| 4,090,409 | 5/1978 | Ohleyer | 74/128 |

FOREIGN PATENT DOCUMENTS

| 488731 | 12/1952 | Canada | 74/126 |
|---|---|---|---|
| 564519 | 10/1944 | United Kingdom | 74/128 |
| 627949 | 8/1949 | United Kingdom | 74/128 |
| 580389 | 11/1977 | U.S.S.R. | 74/126 |

Primary Examiner—Lawrence J. Staab
Attorney, Agent, or Firm—Burns, Doane, Swecker & Mathis

[57] ABSTRACT

Apparatus for rotating a shaft of a turbine is disclosed. This apparatus includes a ratchet wheel which is connected to the shaft, and a pawl which engages the teeth of the ratchet wheel. The teeth of the ratchet wheel have bearing surfaces with convex curvatures, while the pawl has a contact surface which also has a convex curvature.

3 Claims, 6 Drawing Figures

SHAFT-TURNING DEVICE

BACKGROUND AND SUMMARY OF THE PRESENT INVENTION

The invention disclosed herein pertains generally to shaft-turning devices and more particularly to an arrangement for turning a turbine shaft.

After a turbine has been shut down, it is still necessary to keep the turbine rotor shaft turning at a slow rate until the rotor has cooled off completely in order to prevent the shaft from warping. When starting the turbine it is again necessary to turn the rotor shaft in order to gradually overcome the inertia of the machine.

Prior art shaft-turning devices, used for rotating turbine shafts, usually include a system of rods which slide vertically and which are moved by a drive mechanism. A bolt or pawl or latch, which is connected to the system of rods, engages the teeth of a gear, which gear is fixedly connected to a turbine shaft. By rotating the gear teeth the pawl and the system of rods turn the turbine shaft. In such prior art shaft-turning devices the system of rods may be either pushed or pulled in the vertical direction. This is disclosed in the Swiss Pat. No. 592,826.

The prior art shaft-turning devices referred to above have the disadvantage that the teeth of the gears connected to the turbine shafts, as well as the sections of the pawls which engage these teeth, are angular, and that in most instances the engaging sections of the teeth of the gears have a concave shape. Where the gear teeth of shaft-turning devices have such a concave shape, the engaging pawls have either a convex or a circular shape. If the upstroke of a pawl is improperly set, or the gear continues to turn after the pawl upstroke, there is a danger that either the gear teeth and the pawl will not mesh or that the pawl will strike the top of a tooth during a subsequent upstroke. Because great forces must be applied to rotate a turbine shaft, the abovementioned situations may result in damage to the engaging sections or even to a breaking of the gear teeth. There is even a danger of destroying the turning device should a ratchet wheel rotate backwardly. Such a situation may arise with compressor drive shutdowns where the torque exerted by the backward turning ratchet wheel overrides the turning force of the pawl.

Accordingly, a primary object of the present invention is to provide a shaft-turning device having a ratchet wheel and a pawl whereby the pawl may engage the teeth of the ratchet wheel in any position, even if the ratchet wheel is rotating backwardly, without any damage to the pawl or to the teeth of the ratchet wheel.

Apparatus for rotating a shaft of a turbine, according to the present invention, includes a ratchet wheel having teeth with bearing surfaces which have convex roll-off curvatures. A pawl which engages the teeth of the ratchet wheel has a contact surface with a convex roll-off curvature similar to that of the teeth. In addition, the pawl includes a flat upper surface which merges into the contact surface, and a snout-like projection which extends from the contact surface.

By giving each tooth of the ratchet wheel a convex roll-off curvature, the bearing surface of each tooth is made to extend from a base of the tooth to a top of the tooth. This is an advantage of the present invention because the turning force exerted by the pawl may then be applied at any point over the full length of each tooth without causing any damage. Furthermore, in the event of a faulty engagement between the pawl and a ratchet tooth, the shapes of the pawl and the tooth permit the pawl to slide into engagement with a succeeding tooth without incurring any damage.

A further advantage of the present invention is that the shape of the pawl prevents it from jamming into or grating a tooth base, which jamming and grating could otherwise lead to damage produced by frictional heating.

BRIEF DESCRIPTION OF THE DRAWINGS

A preferred embodiment of the present invention is described with reference to the accompanying drawings wherein like members bear like references numerals and wherein.

DETAILED DESCRIPTION OF THE PREFERRED EMBODIMENT

Figure 1:
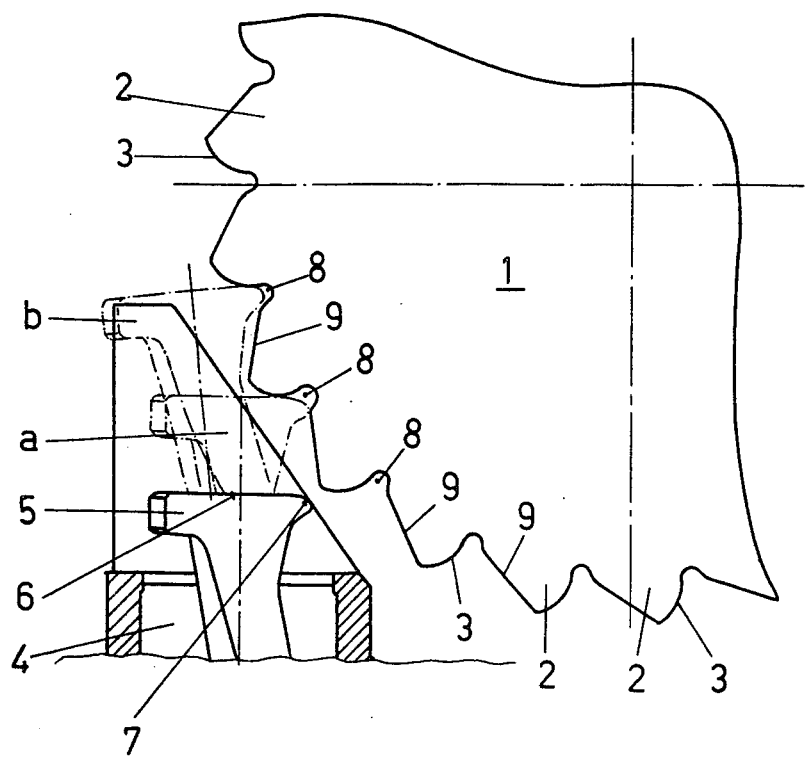
FIG. 1 is a front view of a portion of a ratchet wheel and a pawl, partly in perspective, according to the present invention.

With reference to FIG. 1, a shaft-turning device according to the present invention includes a ratchet wheel 1 mounted on a shaft (not shown). The ratchet wheel 1 includes a plurality of teeth 2 having bearing surfaces 3, which bearing surfaces have convex roll-off curvatures. A conventional ratchet wheel turning device 4, which is only partially shown in FIG. 1, includes a pawl 5 which can move in a vertical direction and which can swivel about a fulcrum (not shown).

The pawl 5 preferably includes a flat upper surface 6 which merges, as one moves toward the ratchet wheel 1, into a curved contact surface having a convex curvature with a radius $R_2$. This curved contact surface terminates in a snout-like projection 7. The curved contact surface engages the bearing surface of each tooth of the ratchet wheel 1 while the projection 7, which preferably has a shape of a wedge with a rounded point, fits into a corresponding recess at a base 8 of each tooth.

Two positions of the pawl 5 are shown in FIG. 1 by means of dot-dash lines. A first position a is at a beginning of a turning engagement between the pawl 5 and a tooth of the ratchet wheel 1. The pawl 5 assumes a second position b after a completion of a one pitch turn of the ratchet wheel 1.

Figure 2:
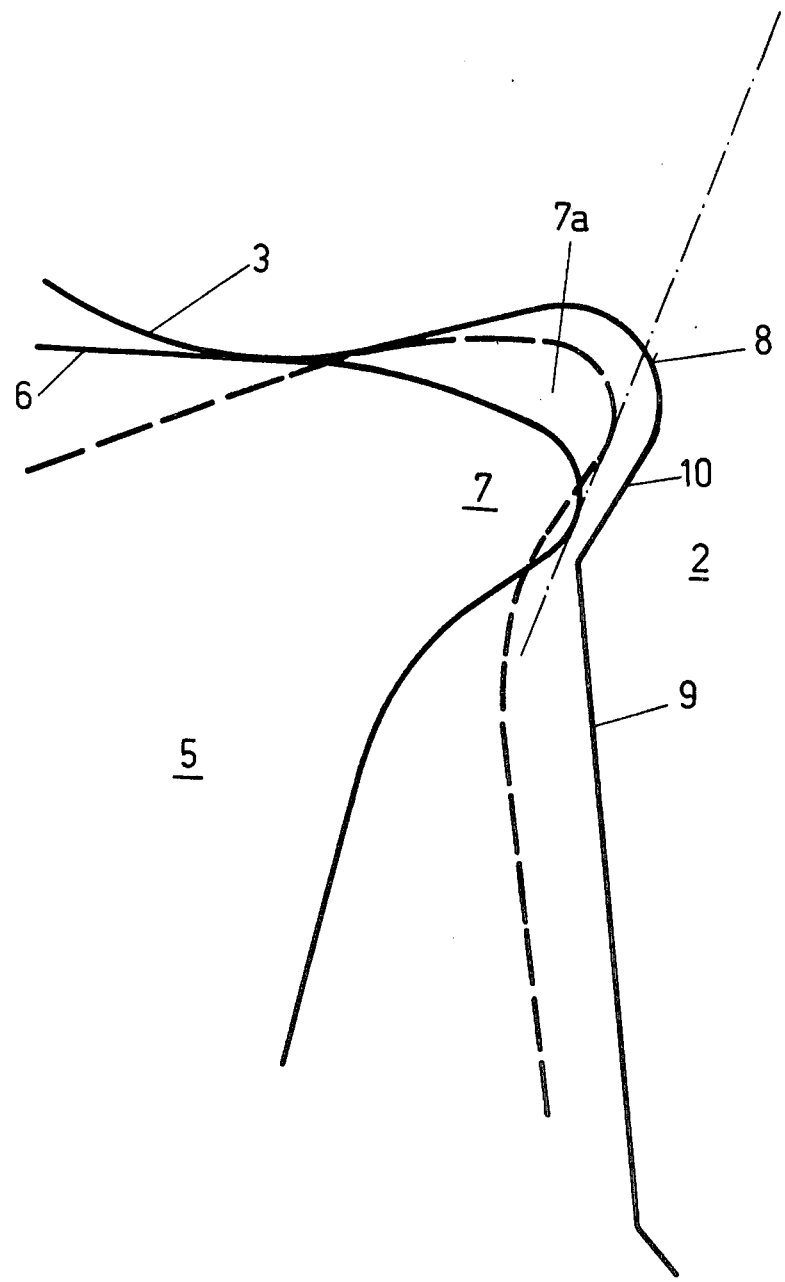
FIG. 2 is an enlarged frontal view of a portion of a pawl and ratchet wheel tooth, according to the present invention, depicting a normal engagement sequence between these members.

With reference to FIG. 2, each tooth of the ratchet wheel 1 includes a bearing surface 3 having a convex curvature. The bearing surface 3 extends from a top of the tooth to a base 8 of the tooth, and the bearing surface merges smoothly into the base 8. The base 8 includes a recess in the shape of a rounded V. Extending from the base 8 is a straight transitional segment 10, which leads to another straight, flat segment 9. The segment 9 defines a top of a succeeding tooth, which top intersects a bearing surface of the succeeding tooth.

The geometrically straight, flat surface of segment 9 serves an important purpose. In the event of a backward rotation of the ratchet wheel 1, the pawl 5 will be pushed back and the flat surfaces 9 of each tooth will glide over the pawl 5 without causing damage. The possibility of backward rotation of the ratchet wheel 1 is particularly associated with turbine compressor drives at times of power shutdowns.

The sequence of movements of the pawl 5, when normally engaging one of the teeth 2 of the ratchet wheel 1, is shown in FIG. 2. The initial position of the pawl 5 and the initial position of the projection 7 is shown by a solid line. The final position of the pawl 5 and the final position of the projection 7 is shown by a dashed line. In the final position the projection 7 is denoted by the numeral 7a. Because the projection 7 never fully comes into contact with the transition 10 or the base 8 during its sequence of movements, it is not subjected to frictional wear and thus suffers no damage.

Figure 3:
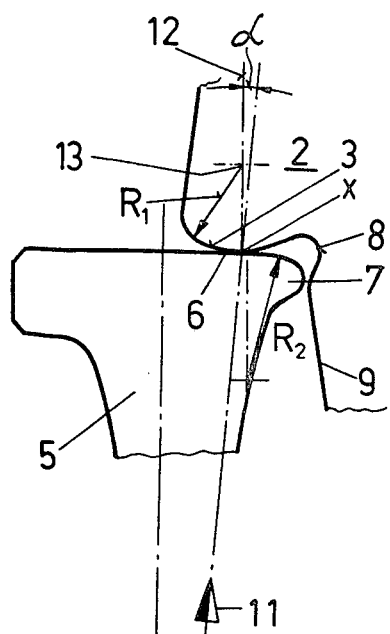
FIG. 3 is a frontal view of a pawl and ratchet wheel tooth showing the initial relative positions of these members during a normal engagement.

FIG. 3 illustrates the initial relative positions of one of the teeth 2 of the ratchet wheel 1 and the pawl 5, during a normal rotational engagement of these members. With reference to FIG. 3, the flat upper surface 6 of the pawl 5 makes initial contact with the convexly curvatured bearing surface 3 at a contact point x. The radius of curvature $R_1$ of the bearing surface 3 is denoted by an arrow in FIG. 3. A direction of impact 11 of the pawl 5 with the bearing surface 3 is also denoted by an arrow. This impact direction 11 is at an angle, $\alpha$, with respect to a perpendicular 12 to the bearing surface 3 at the contact point x, which perpendicular passes through a center 13 of the radius $R_1$. The angle $\alpha$ is typically 4°.

The flat upper surface 6 gives the pawl 5 a tendency to glide toward the tooth base 8. But at an impact angle of 4° the pawl 5 is unable to overcome the frictional forces impeding it from making contact with the tooth base 8. The pawl could only make contact at a much larger impact angle and the gliding would still be impeded by the projection 7 which would contact the tooth base 8.

Figure 4:
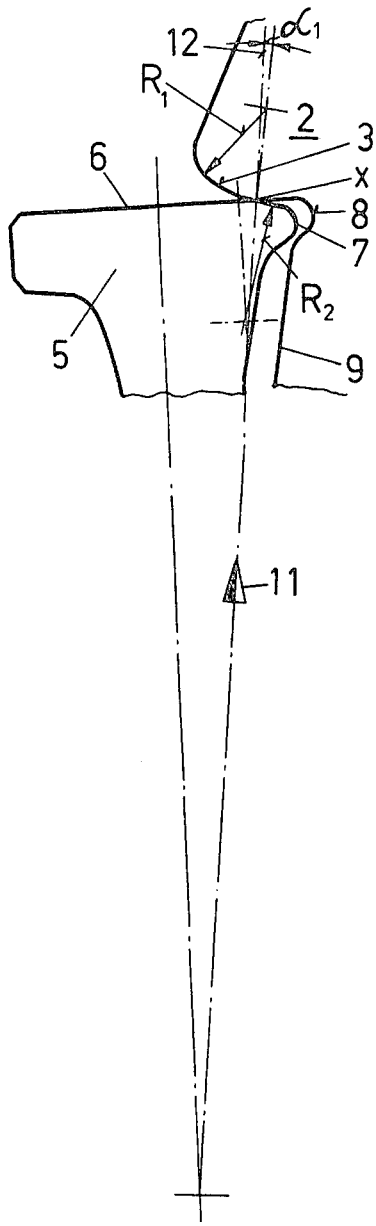
FIG. 4 is a frontal view of a pawl and ratchet wheel tooth showing the final relative positions of these members during a normal engagement.

FIG. 4 illustrates the final relative positions of one of the teeth 2 of the ratchet wheel 1 and the pawl 5, during a normal rotational engagement of these members. With reference to FIG. 4, when the pawl 5 has reached its final position during the course of a turning movement, the curved contact surface of the pawl 5 is then in contact with the convexly curvatured bearing surface 3 at a contact point x. The radius of curvature $R_2$ of the curved contact surface is denoted by an arrow in FIG. 4. Because of the rolling-off action produced by the convexly curvatured bearing surface 3 on the curved contact surface of pawl 5, the contact point x has moved toward the tooth base 8. The direction of impact 11, again denoted by an arrow, is now at a relatively small angle, $\alpha$, with respect to a perpendicular 12 to the surface 3 at the contact point x, which perpendicular now passes through the centers of the radii $R_1$ and $R_2$. The projection 7 of the pawl 5 is prevented from sliding off the convexly curvatured bearing surface 3 because a relatively low coefficient of friction ($\mu \approx 0.026$) would be required for such a sliding action.

If the ratchet wheel 1 had a relatively larger diameter, the direction of impact 11 would be slightly more inclined toward the ratchet wheel 1 relative to the center 13 of the radius of curvature $R_1$ of the bearing surface 3. This would be true of the impact angle even in the final positions assumed by the pawl 5 and a tooth of the ratchet wheel 1. In such a situation the bearing surface 3 would still rest on the flat upper surface 6 of pawl 5.

Figure 5:
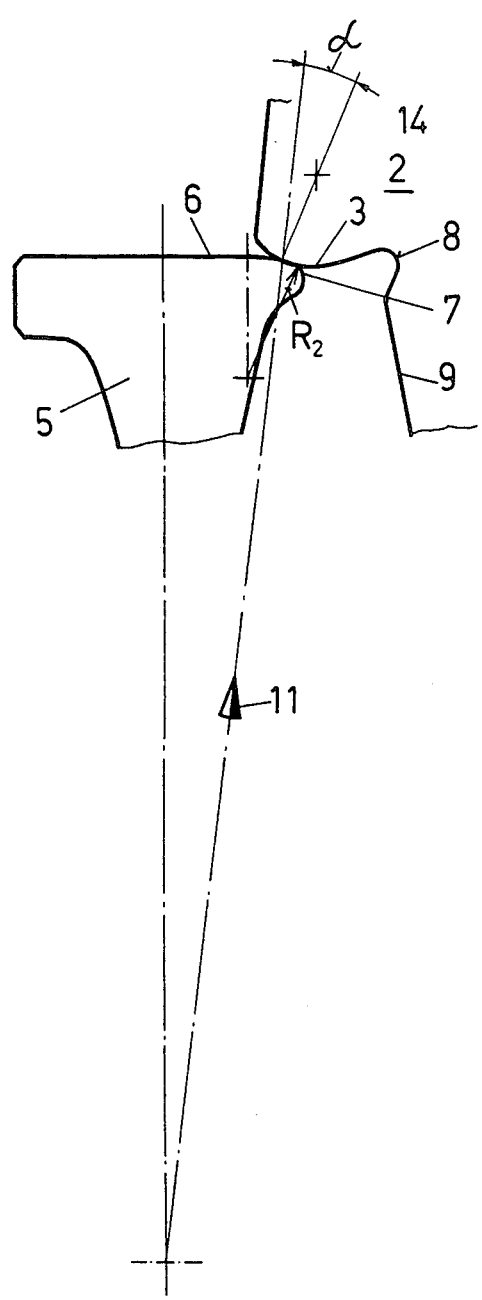
FIG. 5 is a frontal view of a pawl and ratchet wheel tooth showing the relative positions of these members during a first faulty or abnormal engagement.

With reference to FIG. 5, an improper or faulty meshing of the pawl 5 with a tooth 2 of the ratchet wheel 1 results in an impact direction 11 which is at a relatively greater angle $\alpha$, for example an angle of 16°, to a perpendicular 14 to a point of contact between the surface 3 and the pawl 5. In such an event the pawl 5 will slide from an extreme point of contact with the surface 3 of the tooth 2 into engagement with a succeeding tooth of the ratchet wheel 1. Even in this extreme circumstance the point of contact between the pawl 5 and the tooth 2 will be located on the curved contact surface of pawl 5, which contact surface has a radius of curvature $R_2$, and on an extreme end of the convexly curvatured bearing surface 3. Thus, damage to the pawl 5 or to the tooth 2 is avoided.

Figure 6:
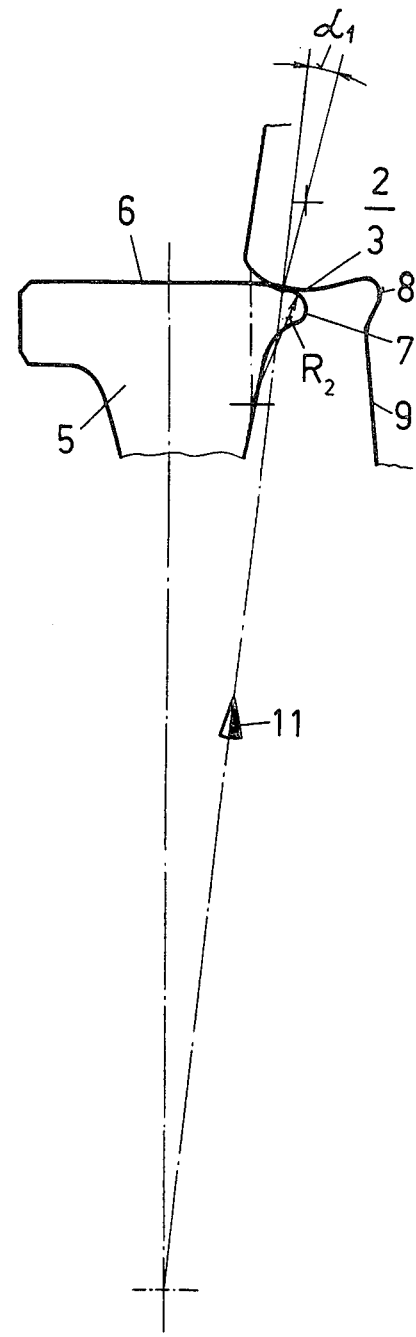
FIG. 6 is a frontal view of a pawl and ratchet wheel tooth showing the relative positions of these members during a second faulty or abnormal engagement.

FIG. 6 illustrates a faulty meshing between the pawl 5 and a ratchet wheel tooth 2 after the ratchet wheel 1 has been partially turned by the pawl 5. If the tooth has already moved past a final position, then either this tooth or a succeeding tooth will be engaged by the pawl 5 during the next upstroke of the pawl 5.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the present invention.

What is claimed is:

1. Apparatus for rotating a shaft, comprising:
   a ratched wheel on said shaft, said ratchet wheel having a plurality of teeth said teeth having a substantially straight and flat segment intersecting a bearing surface at the top of the teeth and having a base portion which includes a recess having a rounded V shape between said flat segment and said bearing surface, said bearing surface having a convex curvature extending from said top portion to said base portion;
   a pawl having a contact surface for engagement with said teeth, said contact surface having a substantially straight flat portion merging into a convex portion, said pawl contact surface also having a projection in the shape of a wedge with a rounded point; and
   means for intermittently engaging the pawl with each of the teeth of the ratchet wheel, said pawl being positioned for engagement of said pawl contact surface with said teeth bearing surface for turning said shaft and for engagement of said pawl projection with said teeth straight segment as the shaft turns, said pawl and teeth surfaces cooperating to roll off in normal operations and to slide off harmlessly upon insufficient teeth engagement by the pawl.

2. Apparatus according to claim 1 wherein said recess of said teeth includes a substantially straight transitional segment extending from said base portion to said flat segment, said teeth bearing surface having a center of said convex curvature and said pawl contact surface having a center of convex curvature, said centers of convex curvature being in substantial alignment with the point of contact between said teeth surface and said bearing surface during normal operation, thereby providing rolling action.

3. Apparatus according to claim 1 wherein said pawl contact surface progressively engages said teeth bearing surface in normal operations along said flat portions of said pawl and then along said convex portions and then along said projections while rotating said ratchet wheel.

* * * * *